(12) United States Patent
Huang et al.

(10) Patent No.: US 10,630,911 B2
(45) Date of Patent: Apr. 21, 2020

(54) IMAGE PROCESSING METHOD AND IMAGE PROCESSING DEVICE

(71) Applicant: ALTEK CORPORATION, Hsinchu (TW)

(72) Inventors: Hsu-Lien Huang, Taipei (TW); Kai-Lin Chan, Hsinchu (TW)

(73) Assignee: ALTEK CORPORATION, Hsinchu (TW)

( * ) Notice: Subject to any disclaimer, the term of this patent is extended or adjusted under 35 U.S.C. 154(b) by 0 days.

(21) Appl. No.: 16/292,335

(22) Filed: Mar. 5, 2019

(65) Prior Publication Data

US 2020/0084362 A1 Mar. 12, 2020

(30) Foreign Application Priority Data

Sep. 6, 2018 (TW) .............................. 107131335 A

(51) Int. Cl.
*H04N 5/235* (2006.01)
*G06T 5/50* (2006.01)

(52) U.S. Cl.
CPC ............ *H04N 5/2355* (2013.01); *G06T 5/50* (2013.01); *H04N 5/2351* (2013.01); *H04N 5/2356* (2013.01); *G06T 2207/10144* (2013.01); *G06T 2207/20208* (2013.01)

(58) Field of Classification Search
CPC .. H04N 5/2355; H04N 5/2351; H04N 5/2356; G06T 5/50; G06T 2207/20208; G06T 2207/10144
See application file for complete search history.

(56) References Cited

U.S. PATENT DOCUMENTS

| 7,702,184 B2* | 4/2010 | Aiso ..................... G06T 3/4069 382/293 |
| 9,420,198 B2 | 8/2016 | Cote et al. |
| 9,648,248 B2* | 5/2017 | Gupta .................. H04N 5/2352 |
| 10,193,627 B1* | 1/2019 | Herman ............... H04B 10/116 |
| 2009/0009614 A1* | 1/2009 | Kawai ................ H04N 5/23248 348/208.12 |

(Continued)

FOREIGN PATENT DOCUMENTS

| CN | 103324033 | 9/2013 |
| CN | 104869320 | 8/2015 |

(Continued)

*Primary Examiner* — Chiawei Chen
(74) *Attorney, Agent, or Firm* — JCIPRNET

(57) ABSTRACT

The disclosure provides an image processing method and an image processing device. The method includes: retrieving a first image of a specific scene, and capturing a first subject from the first image; determining a first brightness based on the first subject; using the first brightness as a reference value of a bracketing mechanism, and performing the bracketing mechanism to capture a plurality of second images of the specific scene; synthesizing the second images as a first high dynamic range image; capturing a second subject from the first high dynamic range image, wherein the second subject has a second brightness; when the second brightness is lower than the first brightness by a predetermined threshold, optimizing the second subject; synthesizing the optimized second subject with the first high dynamic range image as a second high dynamic range image.

20 Claims, 5 Drawing Sheets

(56) References Cited

U.S. PATENT DOCUMENTS

| | | | | |
|---|---|---|---|---|
| 2010/0194963 | A1* | 8/2010 | Terashima | G11B 27/105 348/333.11 |
| 2010/0295962 | A1* | 11/2010 | Terauchi | H04N 5/23219 348/222.1 |
| 2011/0279709 | A1* | 11/2011 | Nonaka | H04N 5/232 348/231.6 |
| 2013/0293748 | A1* | 11/2013 | Fukutomi | G06T 5/007 348/254 |
| 2014/0176789 | A1* | 6/2014 | Kubota | H04N 5/23219 348/362 |
| 2014/0267883 | A1* | 9/2014 | Vidal-Naquet | G06T 7/00 348/362 |
| 2015/0043811 | A1* | 2/2015 | Prabhudesai | G06T 5/008 382/164 |
| 2015/0163391 | A1* | 6/2015 | Osawa | G06T 7/0002 348/222.1 |
| 2015/0170389 | A1* | 6/2015 | Ming | G06K 9/00684 382/284 |
| 2015/0249774 | A1* | 9/2015 | Bienvenu | H04N 5/211 348/614 |
| 2015/0249779 | A1* | 9/2015 | Vidal-Naquet | H04N 5/2355 348/229.1 |
| 2015/0312463 | A1* | 10/2015 | Gupta | H04N 5/2352 348/239 |
| 2016/0093106 | A1* | 3/2016 | Black | G06K 9/00624 345/633 |
| 2017/0054905 | A1* | 2/2017 | Iwasaki | H04N 5/23238 |
| 2017/0148165 | A1 | 5/2017 | Houjou et al. | |
| 2018/0084181 | A1* | 3/2018 | Sachs | H04N 5/2356 |

FOREIGN PATENT DOCUMENTS

| | | |
|---|---|---|
| CN | 105959591 | 9/2016 |
| CN | 108337447 | 7/2018 |
| TW | 201804434 | 2/2018 |

* cited by examiner

IMAGE PROCESSING METHOD AND IMAGE PROCESSING DEVICE

CROSS-REFERENCE TO RELATED APPLICATION

This application claims the priority benefit of Taiwan application serial no. 107131335, filed on Sep. 6, 2018. The entirety of the above-mentioned patent application is hereby incorporated by reference herein and made a part of this specification.

BACKGROUND OF THE INVENTION

1. Field of the Invention

The present disclosure relates to an image processing method and an image processing device, and more particularly to an image processing method and an image processing device that can optimize a subject photographed in an image.

2. Description of Related Art

When shooting a scene with high contrast brightness (for example, backlighting scene) in the traditional single image capturing technology, the quality of the captured image may be unsatisfying due to the exposure mechanism which is difficult to be calibrated under the limitations of the dynamic range of the sensors. For example, in the case where the subject (e.g., the portrait) is dark in the image, conventional practice may select a longer exposure setting in order to increase the image brightness of the subject area. However, this method may cause overexposure in other areas of higher brightness in the image due to an increase in exposure time. That is, although this method allows the subject to have a relatively normal brightness in the generated image, it may cause the background to be overexposed, as shown in FIG. 1A.

On the other hand, if the exposure setting is changed to focus on the bright area, in order to avoid overexposure in the bright area, a shorter exposure time will be selected accordingly. However, this may instead cause the image subject area to be too dark due to underexposure, as shown in FIG. 1B. In other words, no matter what exposure setting is used, it is difficult to produce images with clear subjects and backgrounds.

The well-known high dynamic range (HDR) technique is a technique for processing multiple images by superimposing images taken based on different exposure values and then adjusting by tone reproduction to produce an HDR image with both highlight and shadow details. Through the HDR mechanism, the dynamic range of the scene can be restored more accurately while avoiding areas where the image is overexposed or too dark and retaining details of the bright and dark areas.

However, the adjustment of the regional tone reproduction is not only time consuming, but also prone to lead to glows (i.e., an abnormal white or black border at the black and white boundary), as shown in FIG. 1C. Moreover, in the HDR image generated by the conventional HDR image processing technology, the brightness of the subject may be lowered as the image is superimposed, which may cause a decrease in the contrast of the subject and an unnatural brightness change.

Conventionally, a high-HDR image synthesis algorithm is proposed to directly acquire a plurality of original images with different exposures by using a machine learning and image synthesis model, and then synthesize a reference high dynamic range image according to network parameters. However, this prior art could not achieve the effect of improving the image quality of the subject in the HDR image.

Also, a method for operating a device to capture an HDR image has been proposed to take multiple photos in a normal exposure manner before accepting an HDR command, and obtain an overexposed and underexposed photo after accepting the HDR command. Afterward, the normally exposed, overexposed and underexposed photos are aligned. However, this prior are also failed to achieve the effect of improving the image quality of the subject in the HDR image.

A conventional imaging technique for skin sectioning has been proposed, which can take a non-HDR photo first and then take an HDR photo of the same location. However, the previous case also failed to achieve the effect of improving the image quality of the subject in the HDR image.

A conventional method and system for implementing partial HDR has been proposed, in which a user can manually select a partially exposed region and adjust an exposure value for a particular region. However, since the mechanism for adjusting the exposure value in this prior art is highly related to the manual operation content of the user, the effect of improving the image quality of the subject in the HDR image cannot be effectively achieved.

SUMMARY OF THE INVENTION

Accordingly, the present disclosure provides an image processing method and an image processing device, which can be used to solve the above technical problems.

The disclosure provides an image processing method, including: retrieving a first image of a specific scene, and extracting a first subject from the first image; determining a first brightness based on the first subject; using the first brightness as a reference value of a bracketing mechanism, and executing the bracketing mechanism to capture a plurality of second images for the specific scene; synthesizing the second images as a first high dynamic range image; extracting a second subject from the first high dynamic range image, wherein the second subject has a second brightness; optimizing the second subject when the second brightness is lower than the first brightness by a predetermined threshold; and synthesizing the optimized second subject and the first high dynamic range image as a second high dynamic range image.

The disclosure provides an image processing device, including a non-transitory storage circuit, an image capturing circuit, and a processor. The non-transitory storage circuit stores a plurality of modules. The processor is coupled to the storage circuit and the image capturing circuit and accesses the modules to perform the following steps: controlling the image capturing circuit to retrieve a first image of a specific scene, and extracting a first subject from the first image; determining a first brightness based on the first subject; using the first brightness as a reference value of a bracketing mechanism, and controlling the image capturing circuit to perform the bracketing mechanism to capture a plurality of second images for the specific scene; synthesizing the second images as a first high dynamic range image; extracting a second subject from the first high dynamic range image, wherein the second subject has a second brightness; optimizing the second subject when the second brightness is lower than the first brightness by a predetermined threshold; synthesizing the optimized second subject and the first high dynamic range image as a second high dynamic range image.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
FIG. 1A is a schematic diagram showing overexposed background.
Figure 1B:
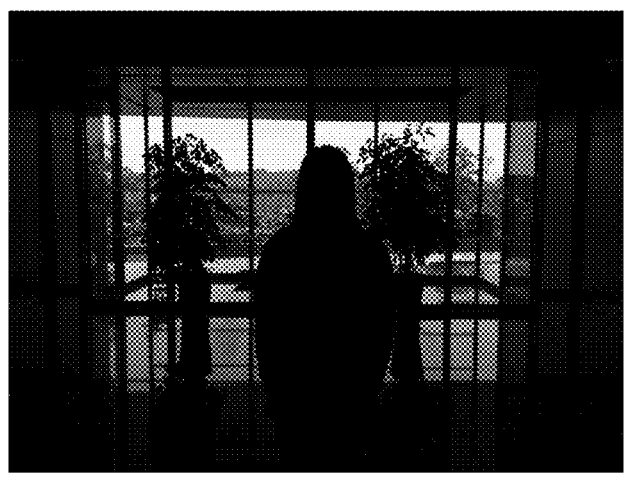
FIG. 1B is a schematic diagram showing the subject being too dark.
Figure 1C:
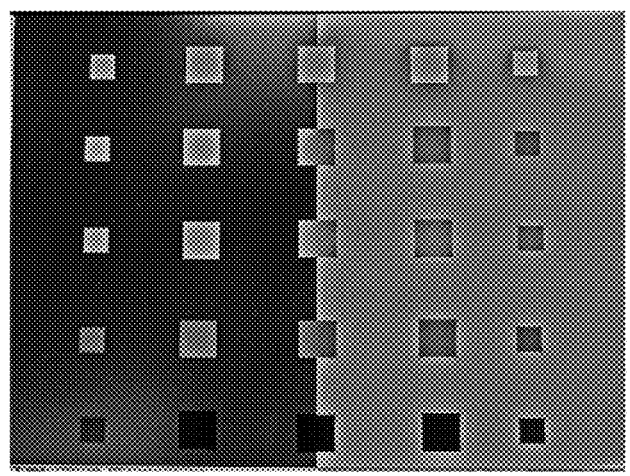
FIG. 1C is a schematic diagram showing the glow phenomenon.

Reference will now be made in detail to the present preferred embodiments of the invention, examples of which are illustrated in the accompanying drawings. Wherever possible, the same reference numbers are used in the drawings and the description to refer to the same or like parts.

Figure 2:
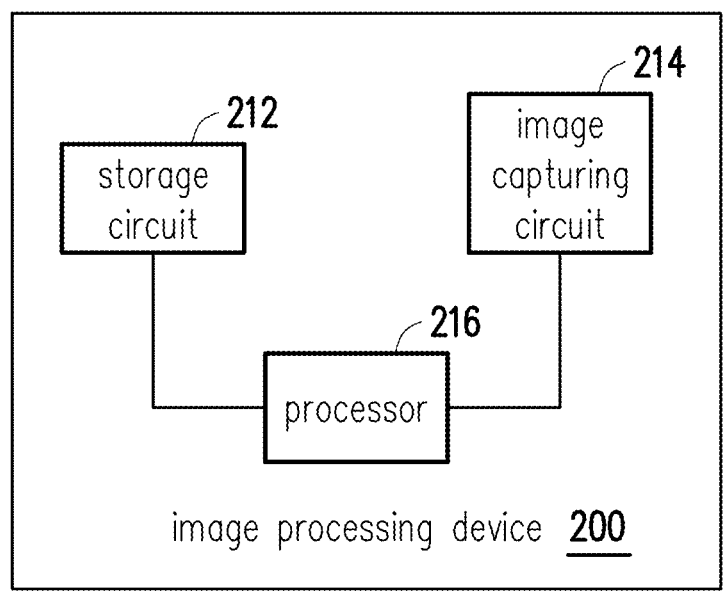
FIG. 2 is a functional block diagram of an image processing device according to an embodiment of the disclosure.

Please refer to FIG. 2, which is a functional block diagram of an image processing device according to an embodiment of the disclosure. In the embodiment, the image processing device 200 includes a storage circuit 212, an image capturing circuit 214, and a processor 216.

In various embodiments, the image processing device 200 can be a mobile phone, a smart phone, a personal computer (PC), a notebook PC, a netbook PC, a tablet PC, a digital camera or other similar smart devices, but the disclosure is not limited thereto.

The storage circuit 212 can be any type of fixed or removable random access memory (RAM), read-only memory (ROM), flash memory, a hard disc or other similar devices that can be used to store computer readable and programmable software, images, programming modules and other information.

The image capturing circuit 214 can be any camera having a charge coupled device (CCD) lens, a complementary metal oxide semiconductor transistor (CMOS) lens, or an infrared lens, or can be an image capturing device that may obtain depth information, such as a depth camera or a stereo camera.

The processor 216 is coupled to the storage circuit 212 and the image capturing circuit 214, and can be a general purpose processor, a special purpose processor, a conventional processor, a digital signal processor, a plurality of microprocessors, or one or more microprocessors combined with digital signal processing cores, controllers, microcontrollers, Application Specific Integrated Circuits (ASICs), Field Programmable Gate Arrays (FPGAs), integrated circuits, state machines, processors based on Advanced RISC Machine (ARM), and the like.

Figure 3:
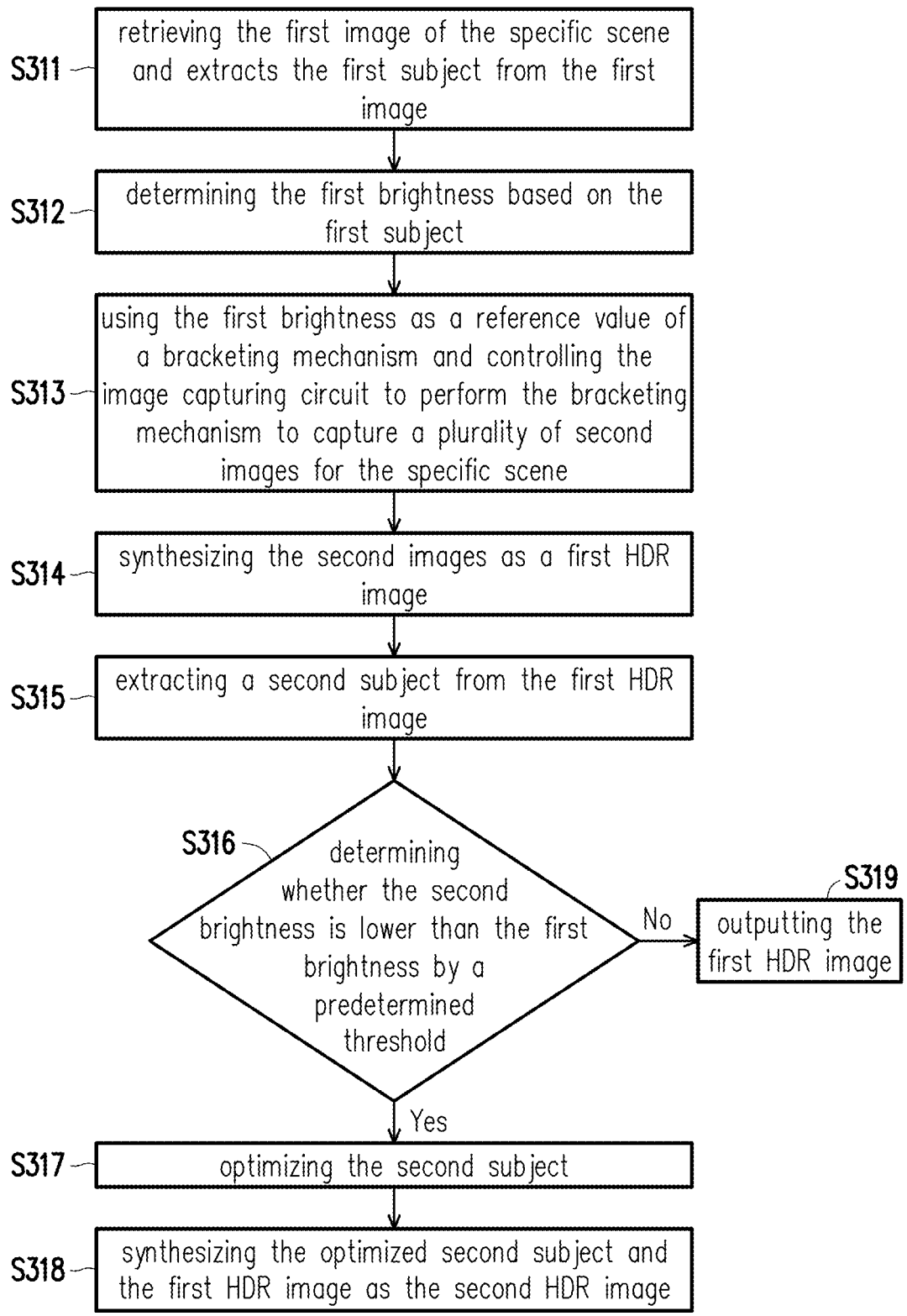
FIG. 3 is a flowchart of an image processing method according to an embodiment of the present disclosure.
Figure 4:
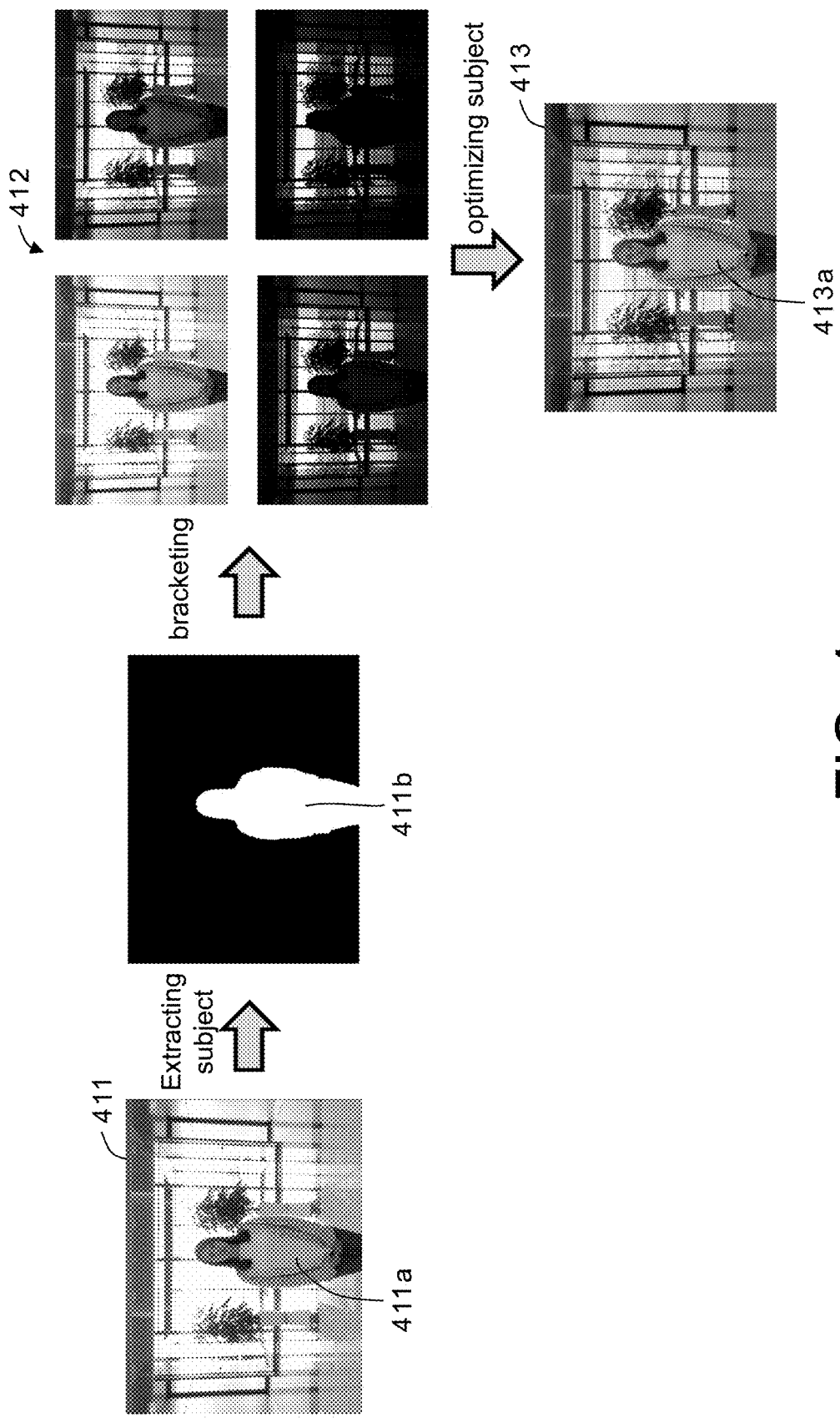
FIG. 4 is an application scenario for performing subject optimization using the method of FIG. 3 according to an embodiment of the disclosure.

See FIG. 3 and FIG. 4, wherein FIG. 3 is a flowchart of an image processing method according to an embodiment of the present disclosure, and FIG. 4 is an application scenario for performing subject optimization using the method of FIG. 3 according to an embodiment of the present disclosure. The method of FIG. 3 can be performed by the image processing device 200 of FIG. 2, and the details of the steps of FIG. 3 will be described in accompanying with the elements shown in FIG. 2 and the scenario shown in FIG. 4.

In step S311, the processor 216 controls the image capturing circuit 214 to retrieve the first image 411 of the specific scene and extracts the first subject 411a (for example, the human body) from the first image 411.

In an embodiment, the processor 216 can input the first image 411 into an artificial intelligence module to capture the first subject 411a based on the artificial intelligence module. The artificial intelligence module can train an artificial intelligence model based on a certain amount of training data (for example, training images) in advance. In different embodiments, the aspects of the subject (such as a human body, an animal, a plant, etc.) that the designer wants to consider may be marked manually or otherwise in the aforementioned training images, so that the aforementioned artificial intelligence model may be trained to learn that what kind of features (e.g., colors, shapes) are necessary for objects or regions to be recognized as the subject in an image based on the marked aspects of the subjects in the training images. After the above training process is completed, when the artificial intelligence model receives an unknown image, it can analyze the features of each object and region in the unknown image to find out which objects and regions may correspond to the subject of the unknown image (e.g., a human body), but the present disclosure is not limited thereto. Therefore, in an embodiment, after the first image 411 is received by the artificial intelligence module, the first subject 411a in the first image 411 can be identified by the artificial intelligence model.

In another embodiment, the processor 216 can also generate a depth map of the first image 411 and analyze the depth map to find the first subject 411a therein. For example, when the image capturing circuit 214 is implemented as a depth camera (such as a time-of-flight (TOF) camera), a stereo camera, a dual lens camera, an infrared depth sensing module, or other devices capable of obtaining the depth of images, the processor 216 can control the image capturing circuit 214 to generate a depth map of the first image 411. Thereafter, the processor 216 can find an object region that is closer to the image processing device 200 (i.e., shallower in depth) from the depth map. Next, the processor 216 may mark the object area as the subject area 411b as shown in FIG. 4, that is, the area corresponding to the first subject 411a, but the disclosure is not limited thereto.

In step S312, the processor 216 may determine the first brightness based on the first subject 411a. In an embodiment, the processor 216 can retrieve a plurality of pixels included in the first subject 411a and the brightness of each of the pixels. Next, the processor 216 can calculate a brightness average of the brightness of each of the pixels and use the brightness average as the first brightness. In other words, the first brightness is the average brightness of the first subject 411a, but the present disclosure is not limited thereto. In other embodiments, if there are multiple subjects in the first image 411, the processor 411 may also use the average brightness of these subjects as the first brightness or the highest brightness among the subjects as the first brightness.

In other embodiments, the first brightness may also be determined by an artificial intelligence module. Specifically, the artificial intelligence module can use a classification module to determine the image classification to which the first image 411 belongs, and then perform a ranking module based on the result of the classification and the first training data (including features and colors). Then, based on the ranked result and the second training data (including, for example, a result of a network vote, a field of view (FOV)), which value is more suitable as the first brightness corresponding to the first image 411 may be determined, but the disclosure is not limited thereto.

In step S313, the processor 216 may use the first brightness as a reference value of a bracketing mechanism and control the image capturing circuit 214 to perform the bracketing mechanism to capture a plurality of second images 412 for the specific scene. In an embodiment, processor 216 may use the first brightness as the 0 exposure value (EV) (i.e., 0 EV) in the bracketing mechanism. Thereafter, the processor 216 can capture the specific scene based on the −N exposure value to the +N exposure value to generate the second images 412, where N is a positive integer. For example, if N is 2, the processor 216 can respectively capture images based on −2 EV, −1 EV, 0 EV (which corresponds to the first brightness, that is, the average brightness of the first subject 411*a*), 1 EV and 2 EV and take the captured images as the second images 412. It should be understood that the second images 412 shown in FIG. 4 are merely examples, which should not be interpreted as limiting possible implementations of the disclosure.

In step S314, the processor 216 can synthesize the second images 412 as a first HDR image (not shown). In this embodiment, the processor 216 may superimpose the second images 412 as the first HDR image based on a known HDR image processing technology, and details would not be further discussed herein.

In step S315, the processor 216 can extract a second subject (not shown) from the first HDR image. In an embodiment, the processor 216 can input the first HDR image to the previously mentioned artificial intelligence module to identify the second subject in the first HDR image through the artificial intelligence model therein. In another embodiment, the processor 216 can also identify the subject region corresponding to the second subject from the depth map corresponding to the first HDR image based on the previously taught manner, thereby defining the second subject in the first HDR image, and the details of which would not be repeated herein.

Since the first HDR image and the first image 411 substantially correspond to the same specific scene, the second subject found through the artificial intelligence module and the previously found first subject 411*a* should substantially correspond to the same subject (i.e., the human body shown in FIG. 4).

However, as mentioned previously, the second subject in the first HDR image may experience a decrease in contrast due to the superposition of the images, which may cause a decrease in the stereoscopic effect of the second subject and an unnatural change in brightness. Therefore, the present disclosure can determine whether the difference between the second brightness of the second subject (for example, the brightness average of the pixels in the region of the second subject) and the first brightness of the first subject 411*a* is too large and take it as a reference for determining whether to optimize the second subject.

Specifically, in step S316, the processor 216 may determine whether the second brightness is lower than the first brightness by a predetermined threshold. In different embodiments, the designer may set the predetermined threshold value to a desired value (for example, 10%, 20%, 30%, etc.), but the disclosure is not limited thereto.

If the second brightness is lower than the first brightness by the predetermined threshold value (for example, 10%), it means that the second subject in the first HDR image may have poor image quality such as a decrease in contrast and a decrease in stereoscopic effect. Therefore, the processor 216 can proceed to perform step S317 to optimize the second subject.

In an embodiment, the processor 216 can adjust the second brightness of the second subject to be the first brightness of the first subject 411*a* to optimize the second subject, thereby making the second subject become brighter. In other embodiments, the processor 216 may also adjust the second brightness of the second subject by any scale value set by the designer (e.g., 10%, 20%, 30%, etc.) to optimize the second subject in a manner of quantitatively increasing the brightness of the second subject, but the disclosure is not limited thereto.

After optimizing the second subject, the processor 216 may proceed to perform step S318 to synthesize the optimized second subject 413*a* and the first HDR image as the second HDR image 413. In an embodiment, the processor 216 may superimpose the optimized second subject 413*a* on the second subject of the first HDR image to generate the second HDR image 413. That is, the image processing device 200 can use the second HDR image 413 as the final output image for the user to view.

As can be observed in the second HDR image 413 shown in FIG. 4, not only the highlight and shadow details can be enhanced in the second HDR image 413, but the image quality of the second HDR image 413 can be further improved due to the optimized second subject 413*a* for having improved brightness.

On the other hand, if the second brightness is determined to be not lower than the first brightness by the predetermined threshold in step S316, it represents that the second subject in the first HDR image may not have issues such as a decrease in contrast or a decrease in stereoscopic effect. Therefore, the processor 216 can proceed to perform step S319 to output the first HDR image. In other words, if the brightness of the second subject does not decrease significantly, the processor 216 may directly use the first HDR image as the final output image without optimizing the second subject.

In summary, the present disclosure provides an image processing method and an image processing device, which can find a first subject from a first image based on an artificial intelligence module or a depth map, and use the average brightness of the first subject as the reference value of the bracketing mechanism. Then, after generating the first HDR image based on the bracketing mechanism, the present disclosure may optimize the second subject when the difference between the brightness of the second subject in the first HDR image and the brightness of the first subject is too large, and accordingly generate a second HDR image. Thereby, in addition to providing clear highlight and shadow details, the second subject of the second HDR image can provide a better stereoscopic effect and a more natural brightness change after being optimized.

In addition, since the present disclosure can automatically recognize the first subject and the second subject through artificial intelligence, not only the operation process can become more efficient, but the outputted HDR image can be guaranteed to have a satisfying image quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image processing method, comprising:
    retrieving a first image of a specific scene, and extracting a first subject from the first image;
    determining a first brightness based on the first subject;
    using the first brightness as a reference value of a bracketing mechanism, and executing the bracketing mechanism to capture a plurality of second images for the specific scene;
    synthesizing the second images as a first high dynamic range image;
    extracting a second subject from the first high dynamic range image, wherein the second subject has a second brightness;
    optimizing the second subject when the second brightness is lower than the first brightness by a predetermined threshold;
    synthesizing the optimized second subject and the first high dynamic range image as a second high dynamic range image.

2. The method of claim 1, wherein the step of extracting the first subject from the first image comprises:
    inputting the first image into an artificial intelligence module to capture the first subject based on the artificial intelligence module.

3. The method of claim 1, wherein the step of extracting the first subject from the first image comprises:
    retrieving a depth map of the first image and analyzing the depth map to find the first subject in the depth map.

4. The method of claim 1, wherein the step of determining the first brightness based on the first subject comprises:
    retrieving a plurality of pixels in the first subject and a brightness each of the pixels; and
    calculating a brightness average of the brightness of each of the pixels and using the brightness average as the first brightness.

5. The method of claim 1, wherein the step of using the first brightness as the reference value of the bracketing mechanism and performing the bracketing mechanism to capture the second image for the specific scene comprises:
    using the first brightness as a 0 exposure value in the bracketing mechanism;
    shooting the specific scene based on a −N exposure value to a +N exposure value to generate the second images, where N is a positive integer.

6. The method of claim 1, wherein the step of extracting the second subject from the first high dynamic range image comprises:
    inputting the first high dynamic range image into an artificial intelligence module to extract the second subject based on the artificial intelligence module.

7. The method of claim 1, wherein the step of extracting the second subject from the first high dynamic range image comprises:
    generating a depth map of the first high dynamic range image and analyzing the depth map to find the second subject in the depth map.

8. The method of claim 1, wherein the first high dynamic range image is outputted when the second brightness is not lower than the first brightness by the predetermined threshold.

9. The method of claim 1, wherein the step of optimizing the second subject comprises:
    adjusting the second brightness of the second subject to be the first brightness of the first subject.

10. The method of claim 1, wherein the step of synthesizing the optimized second subject and the first high dynamic range image as the second high dynamic range image comprises:
    superimposing the optimized second subject on the second subject of the first high dynamic range image to generate the second high dynamic range image.

11. An image processing device, comprising:
    a non-transitory storage circuit, storing a plurality of modules;
    an image capturing circuit;
    a processor, coupled to the storage circuit and the image capturing circuit and accessing the modules to perform the following steps:
        controlling the image capturing circuit to retrieve a first image of a specific scene, and extracting a first subject from the first image;
        determining a first brightness based on the first subject;
        using the first brightness as a reference value of a bracketing mechanism, and controlling the image capturing circuit to perform the bracketing mechanism to capture a plurality of second images for the specific scene;
        synthesizing the second images as a first high dynamic range image;
        extracting a second subject from the first high dynamic range image, wherein the second subject has a second brightness;
        optimizing the second subject when the second brightness is lower than the first brightness by a predetermined threshold;
        synthesizing the optimized second subject and the first high dynamic range image as a second high dynamic range image.

12. The image processing device of claim 11, wherein the processor is configured to:
    input the first image into an artificial intelligence module to capture the first subject based on the artificial intelligence module.

13. The image processing device of claim 11, wherein the processor is configured to:
    retrieve a depth map of the first image and analyzing the depth map to find the first subject in the depth map.

14. The image processing device of claim 11, wherein the processor is configured to:
    retrieve a plurality of pixels in the first subject and a brightness each of the pixels; and
    calculate a brightness average of the brightness of each of the pixels and use the brightness average as the first brightness.

15. The image processing device of claim 11, wherein the processor is configured to:
    use the first brightness as a 0 exposure value in the bracketing mechanism;
    shoot the specific scene based on a −N exposure value to a +N exposure value to generate the second images, where N is a positive integer.

16. The image processing device of claim 11, wherein the processor is configured to:

input the first high dynamic range image into an artificial intelligence module to extract the second subject based on the artificial intelligence module.

17. The image processing device of claim 11, wherein the processor is configured to:
generate a depth map of the first high dynamic range image and analyze the depth map to find the second subject in the depth map.

18. The image processing device of claim 11, wherein the processor outputs the first high dynamic range image when the second brightness is not lower than the first brightness by the predetermined threshold.

19. The image processing device of claim 11, wherein the processor is configured to:
adjust the second brightness of the second subject to be the first brightness of the first subject.

20. The image processing device of claim 11, wherein the processor is configured to:
superimpose the optimized second subject on the second subject of the first high dynamic range image to generate the second high dynamic range image.

* * * * *